MAGNETORESISTIVE LOGICAL CIRCUITRY

Filed Feb. 28, 1962

INVENTORS
CHARLES PETTUS
THOMAS YOUNG

BY Donald R. Campbell
ATTORNEY

United States Patent Office 3,128,390

Patented Apr. 7, 1964

3,128,390
MAGNETORESISTIVE LOGICAL CIRCUITRY

Charles Pettus, Vestal, and Thomas Young, Endicott, N.Y., assignors to International Business Machines Corporation, New York, N.Y., a corporation of New York Filed Feb. 28, 1962, Ser. No. 176,310
8 Claims. (Cl. 307—88)

This invention relates to magnetoresistive logical circuits, and more particularly to a magnetoresistive logic unit and its application in logical circuits such as adders, coincidence counters and the like.

Magnetoresistance is defined as a change in the electrical resistance of a conductor due to the effect of a magnetic field dependent on the orientation of the conductor in the field. In most magnetic materials, mainly the ferromagnetic metals such as iron, cobalt, nickel and their alloys, the resistance increases when the magnetization and the current are parallel and decreases when the magnetization and current are perpendicular. The magnetoresistance also varies with the strength of the magnetic field.

An object of the present invention is to provide new and improved logical circuits employing magnetoresistive elements as components.

Another object is to provide a magnetoresistive logic unit suitable for use in logical circuits.

Yet another object is the provision of a new and improved adder utilizing magnetoresistive elements which operates in the millimicrosecond range.

A further object is to provide a new and improved coincidence counter employing magnetoresistive elements.

In accordance with the invention, the magnetoresistive logic unit comprises a ferromagnetic element, input means connected across the element for establishing flow of current in a given direction, voltage output tap means connected across the element approximately transverse to the direction of current flow, and a pair of means for selectively inducing magnetic fields diagonal to the direction of current flow. When the magnetic fields produced are symmetrical with respect to a reference line perpendicular to the direction of the current, the two fields may be arranged to cancel each other out, to be added vectorially, and one may be applied while the other is not.

In the form of magnetoresistive logic unit utilized in an adder the two magnetic fields produced are symmetrical so that the resultant field is either parallel or perpendicular to the current. Additionally either field may be applied while the other is not, and in this case the change of resistance of the ferromagnetic element is not as great. Consequently there are three distinct output magnitudes from voltage taps connected to the ferromagnetic element transverse to the current flow, corresponding to the three magnetoresistive states of the element.

For a coincidence counter, two of the magnetoresistive logic units are coupled together. Conveniently the magnetic fields are produced by coils or drive lines applied to the ferromagnetic elements, one coil or drive line for each unit serving as an input while the other coil or drive line of each unit is connected in series with the voltage taps of the other unit and provides an output. The occurrence of a pulse at one input coil or drive line switches its respective ferromagnetic element to one state, causing a current to flow in the other coil of that unit. This current balances out any field caused by the subsequent occurrence of a pulse input to the coil or drive line on the second logic unit. If one pulse input occurs before the other pulse input, only one magnetoresistive logic unit is switched and an output appears only at the output of one unit. However in the case that both input pulses occur simultaneously both units are switched and a pulse occurs at the outputs of both magnetoresistive units.

The foregoing and other objects, features and advantages of the invention will be apparent from the following more particular description of preferred embodiments of the invention, as illustrated in the accompanying drawings.

Figure 1:
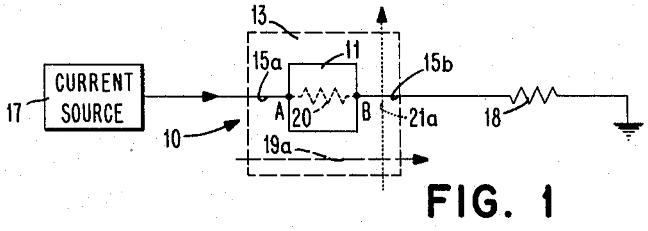
FIG. 1 is a circuit illustrating the principles of magnetoresistive elements.

Briefly reviewing the principles of magnetoresistive devices, there is shown in FIG. 1 an element 10 having magnetoresistive properties conveniently formed as a thin film 11 evaporated by any suitable technique onto a substrate 13, such as glass. Lead lines 15*a* and 15*b* are connected to points A and B on opposite sides of the thin film 11. In one case, film 11 consists of a ½" by ½" evaporated ferromagnetic film approximately 500 A. thick. The electrical contacts to the film are made by soldering alined woods metal contacts along two opposite sides of the film. A suitable generator or source of current 17 is connected to provide either a direct current or a pulsed current through leads 15*a* and 15*b* to the thin film 11. The thin film 11 in effect comprises a resistor which is connected in series with leads 15*a* and 15*b* and external resistor 18 to ground reference.

Magnetic fields having lines of force indicated schematically by dot-dash line 19*a* and dotted line 21*a* are applied alternately and selectively to the thin film 11. The magnetic fields may be produced in any convenient manner such as by coils of wire wrapped around the film and its substrate or by thin films laid down over the ferromagnetic film 11. If desired the magnetic field may be produced by permanent magnets or electromagnets. The magnetic field indicated by dot-dash line 19*a* is in a direction parallel to the current flowing through film 11 and leads 15*a* and 15*b*. The magnetic field indicated by dotted line 21*a* is directed transverse or orthogonal to the direction of current flow through the magnetoresistive film 11. In the case that the magnetic fields are applied by means of coils, the field 19*a* which is parallel to the current is of course produced by the coil or coils wound transverse to the direction of current flow. Likewise, to provide the field 21*a* which is orthogonal to the direction of the current, the coil or coils are wound parallel to the lead lines 15*a* and 15*b*. Either one or the other, or no field, is selectively induced to film 11.

Figure 2:
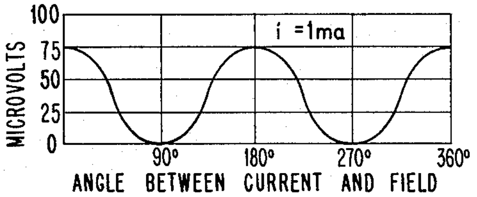
FIG. 2 shows a curve useful in explaining the operation of the device of FIG. 1.

To operate the device of FIG. 1, current from generator or source 17 is supplied through leads 15*a* and 15*b* to magnetoresistive film 11, and the circuits for producing the magnetic fields are energized. The voltage measured across the film (i.e. between points A and B) is plotted in FIG. 2 as a function of the angle between the applied magnetic field and the direction of current flow. Since the current remains constant, it follows that the total resistance 20 of the magnetoresistive element 11 varies in like manner. Thus the resistance of the film 11 increases when the current and magnetization are parallel and decreases when the magnetization is perpendicular to the current. The curve of FIG. 2 is substantially sinusoidal and further indicates that the voltage developed across film 11 is independent of the sense of the applied field, i.e. whether the fields are as shown for example in FIG. 1 are in the direction indicated by the arrowheads or directly opposite thereto will not effect a change in the voltage across film 11. Moreover, when the field is at some intermediate angle to the current, other than 0° or 90° or a multiple thereof, the voltage across the magnetoresistor is at some value between the minimum and maximum voltages measured.

The use of a magnetoresistive element as a storage device is more fully developed in the copending application of F. Partovi, C. Pettus and T. Young, S.N. 160,179, filed December 18, 1961, and entitled "Magnetoresistive Storage Device." It is there shown that when a magnetic field is applied for instance in a direction parallel to current flowing through film 11, a resistance of a first magnitude is evident across film 11; and when the magnetic field in the parallel direction is collapsed, the resistance across film 11 remains at the first magnitude. Similarly, when a magnetic field is developed in a direction orthogonal to current flowing through film 11, a resistance of a second magnitude is evident across film 11; and when the magnetic field in the orthogonal direction is collapsed, the resistance across film 11 remains at the second magnitude. The switching time is in the millimicrosecond range.

Figure 3:
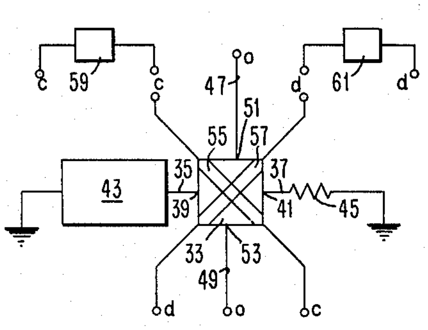
FIG. 3 is a diagram of the magnetoresistive logic unit according to the invention embodied in a logical circuit known as an adder.

Having reviewed the principles of magnetoresistive elements, the form of such a device suitable for application as a magnetoresistive logic unit in logical circuits will now be discussed. Referring to FIG. 3, a ferromagnetic thin film 33 similar to the film 11 is laid down on a suitable substrate such as glass. Logic function applications do not depend on any bistable nature of the film. The most favorable shape would probably be a square. The film should also be fairly thin (less than 1000 A.) in order to keep the resistance as large as possible.

Current input leads 35 and 37 are connected to the film 33 opposite one another at points 39 and 41 on two opposing sides of the square. The connections may be made for instance with indium solder which is subsequently coated with a transparent insulator. Lead 35 is coupled to a current source 43, while lead 37 is connected through a resistance 45 to ground. Thus current from source 43 flows across the magnetoresistive film between points 39 and 41 establishing a reference direction of current flow. Output voltage tap conductors 47 and 49 are connected to the edges of the film 33 at points 51 and 53 spaced along the direction of current flow. Preferably the leads 47 and 49 are on opposite sides of the film, however it will be understood they may be on the same side of the film. The other ends of the conductors 47 and 49 are coupled to respective output terminals *o, o.*

In accordance with the invention, a pair of magnetic fields are produced across the element 33 which are oriented diagonal with respect to the direction of current flow and are applied symmetrically on either side of an imaginary reference line perpendicular to the direction of current flow. Conveniently the magnetic fields are produced by copper bar drive lines applied to the element 33, but may be produced in any other suitable way such as by wrapping coils around the film 33 and its substrate. Thus in FIG. 3 a drive line 55 is evaporated or the like on the film 33 diagonal to the direction of current flow from points 39 to 41 and has input terminals identified for convenience as *c, c.* A second drive line 57 is applied to the film 33 diagonal to the direction of current flow, at an angle to the direction of current flow which is the supplement of the value of the angle at which the drive line 55 is oriented. The second drive line 57 has input terminals identified as *d, d.*

In FIG. 3 the center of film 33 is taken as a reference point. Drive lines 55 and 57 are 90° apart, symmetrical to an imaginary line through the reference point in the plane of the film but perpendicular to the direction of current flow. Each drive line lies 45° to one side of the line of current flow through points 39 and 41. The magnetic fields produced by these drive lines are of course orthogonal to the directions of the windings. It will be appreciated that the drive lines may be at acute angles other than 45° to the direction of current flow, the angle which is chosen being determined more by practical considerations than theoretical as will be evident from the following discussion. A source 59 supplies pulses or the like to input terminals *c, c* while a source 61 supplies an input to terminals *d, d.*

Figure 4:
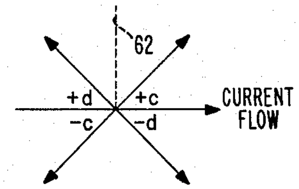
FIG. 4 is a diagram useful in explaining the operation of the circuit of FIG. 3.

The logical circuit of FIG. 3 can be used as an adder for producing sums of 0, 1 and 2. The portion of this circuit comprising the film 33 on its substrate, the field producing means 55 and 57, and a portion of the current input leads 35 and 37 and the voltage output tap leads 47 and 49 will be known as the magnetoresistive logic unit. Such a unit can be packaged conveniently and has general utility as a logic device. To explain the operation of the adder logical circuit, let terminals *c, c* of the first drive line 55 be known as input *c.* In like manner terminals *d, d* of the drive line 57 are referred to as input *d.* FIG. 4 shows the directions of the magnetization vectors for the inputs $+c$ and $+d$ with respect to the direction of current. If the polarity of the potentials applied to these coils is reversed, the inputs are known as $-c$ and $-d$ and the corresponding magnetization vectors are rotated through 180°. The dash line 62 represents the imaginary reference line perpendicular to the direction of current with respect to which the fields are symmetrical.

It follows from the principles of vector addition that with inputs $+c$ and $+d$ energized, the resultant magnetization is perpendicular to the current. Similarly for $-c$ and $-d$. For $+c$ and $-d$ and for $-c$ and $+d$, the resultant magnetization is parallel to the current. When only one input is energized in either sense, the field is at an angle to the current. It will be recalled (also see FIG. 2) that the magnetoresistance of the film 33 changes magnitude as the direction of the field varies with respect to the current flow. Thus there are three distinct levels of output voltages detected at output terminals *o, o.* Proper circuitry may be provided not here shown for establishing one of the voltages at the zero level. The following table is generated:

| Input | Output |
|---|---|
| +c +d | 2V |
| −c −d | 2V |
| 0 ±d | V |
| ±c 0 | V |
| +c −d | 0 |
| −c +d | 0 |

As applied to an adder, let $+c=x$, $-c=y$, $+d=z$, and $-d=w$. Then the truth table reads:

(1) $xz+yw=2V$ (2) $(x+y)(\bar{z}+\bar{w})=V$ (3) $(z+w)(\bar{x}+\bar{y})=V$ (4) $xw+yz=0$ Statement (1) means that either $+c$ and $+d$ or $-c$ and $-d$ equals 2V, and statement (4) in similar manner is interpreted as either $+c$ and $-d$ or $-c$ and $+d$ equals 0. According to statement (2), $+c$ or $-c$ but not $+d$ or $-d$ equals V, and likewise statement (3) says that $+d$ or $-d$ but not $+c$ or $-c$ equals V. A circuit capable of generating Boolean statements of this type is recognized by those familiar with the art as being an adder for producing sums of 0, 1 and 2.

Figure 5:
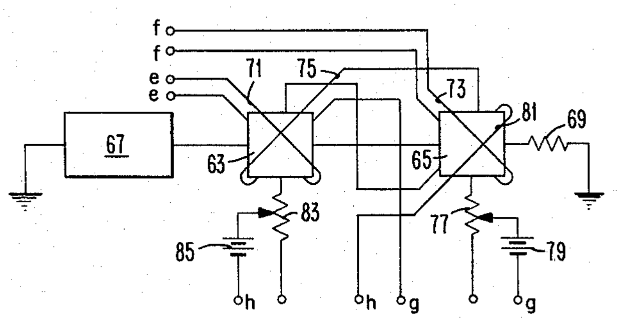
FIG. 5 is a diagram of a coincidence counter circuit employing magnetoresistive logic units.

Another application of the magnetoresistive logic unit is shown in FIG. 5 in which the logical circuit is a coincidence counter. For this circuit two of the magnetoresistive logic units are utilized. Thus a pair of magnetoresistive films 63 and 65 are connected in series with each other and a current source or generator 67 and a resistor 69 which goes to ground. In a manner similar to that described previously, current from source 67 flows across the films 63 and 65 defining a reference direction of current flow. The magnetic fields in this instance are illustrated as being produced by coils. A coil 71 is wrapped around the film 63 diagonal to the direction of current flow and has input terminals *e*, *e*. A similar coil 73 is wrapped around the film 65 diagonal to the direction of current flow and has input terminals *f*, *f*. Another coil 75 is wrapped around the first film 63 displaced from the coil 71, oriented at the same angle to the direction of current flow but oppositely inclined. One end of the coil 75 is connected to an output terminal *g*, while the other end of the coil is connected across the film 65 approximately transverse to the direction of current flow and is coupled through a variable resistor 77 and battery 79 with the other output terminal *g*. In similar manner a second coil 81 is wrapped diagonally around the film 65 displaced from the coil 73 at the same angle as is the coil 73 to the direction of current flow. One end of the coil 81 is connected to an output terminal *h* while the other end is connected across the film 63 approximately transverse to the direction of current flow and is coupled through a variable resistor 83 and a battery 85 to the other output terminal *h*.

Figure 6:
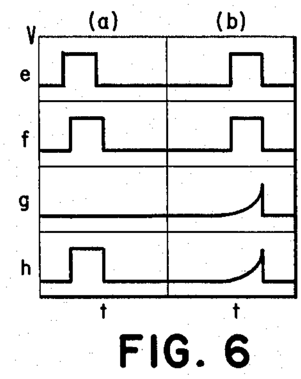
FIG. 6 is a graph of input and output pulses produced by the operation of the circuit of FIG. 6.

Variable resistors or potentiometers 77 and 83 are set such that no current flows in the output circuits when the units are "off." The films 63 and 65 are initially either in their low resistance state or high resistance state. For convenience inputs *e*, *e* will be called input *e*, and the same for input *f* and outputs *g* and *h*. Consider a signal appearing at inputs *e* and *f*, but appearing at *e* first. This signal energizes coil 71 which switches the resistance state of film 63. Since a resistance in the output circuit has been changed, a signal appears at output *h*. However, the output circuit also includes the coil 81 which is wound about the film 65 such that the field it produces balances out the field caused by current now appearing at input *f*. The film 65 does not change its resistance state and there is no signal at output *g* (see FIG. 6(*a*)). Likewise when signals appear at inputs *e* and *f* but that at *f* appears first, coil 73 is energized and switches the resistance state of film 65, causing an output to appear at *g*, and the field produced by coil 75 in this output circuit just balances the field of the coil 71 caused by the signal now appearing at input *e*. There is no output signal at output *h* since film 63 does not switch its resistance state. The third case is when signals appear at inputs *e* and *f* simultaneously. In this case both films switch resistance states and an output pulse appears at both outputs *g* and *h* (see FIG. 6(*b*)).

Two particular logic circuits have been described employing the magnetoresistive logic unit according to the invention. The logic unit has the advantage of small size and low cost and the switching speed is the millimicrosecond range.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A logical circuit including
a magnetoresistive logic unit,
said magnetoresistive logic unit comprising a thin film ferromagnetic element possessing magnetoresistive properties,
current input means connected across said ferromagnetic element and adapted to be coupled to a current source to establish a current flow through said element,
voltage tap output means connected across said ferromagnetic element at points spaced along the direction of current flow,
and means for selectively applying at least two magnetic fields to said ferromagnetic element which are each oriented diagonal to the direction of current flow, but oppositely inclined thereto whereby the resultant fields produced are parallel to, perpendicular to, and at an angle to the direction of current flow.

2. A logical circuit including
a magnetoresistive logic unit,
said magnetoresistive logic unit comprising a ferromagnetic element possessing magnetoresistive properties,
current input means connected across said ferromagnetic element and adapted to be coupled to a current source to establish a current flow through said element,
voltage tap output means connected across said ferromagnetic element at points spaced along the direction of current flow,
and a pair of independently controlled means for producing magnetic fields across said ferromagnetic element,
said pair of field producing means being oriented diagonal to the direction of current flow and symmetrical with respect to a reference line extending perpendicular to the direction of current flow, whereby the resultant magnetic fields produced when both of said means are energized concurrently in various senses is different from the magnetic field produced when only one of said means is energized.

3. A magnetoresistive logic unit for incorporation into a logical circuit,
said magnetoresistive logic unit including a substantially square thin film ferromagnetic element possessing magnetoresistive properties,
current input leads connected across two opposite sides of said ferromagnetic element and adapted to be coupled to a current source to establish a current flow through said element,
voltage tap output leads connected across the remaining two sides of said ferromagnetic element,
and a pair of field producing means carried by said ferromagnetic element,
said field producing means being oriented diagonal to the direction of current flow and symmetrical with respect to a reference line extending perpendicular to the direction of current flow, whereby the resultant magnetic fields produced by said means both singly and in combination are directed parallel to, perpendicular to, and at an acute angle to the direction of current flow.

4. A logical circuit comprising
a magnetoresistive logic unit,
said magnetoresistive logic unit including a substantially square thin film ferromagnetic element possessing magnetoresistive properties,
current input leads connected across two opposite sides of said ferromagnetic element,
said logical circuit including a current source coupled with said current input leads to establish a current flow across said element,
said magnetoresistive logic unit further having voltage output taps connected to the remaining two sides of said ferromagnetic element each perpendicular to the direction of current flow,
a pair of field producing means carried by said ferromagnetic element for selectively producing magnetic fields,
said pair of field producing means each being at an angle of substantially 45° to the direction of current flow but oppositely inclined thereto, and said logical circuit further including means for selectively energizing said field producing means both singly and in combination to produce magnetic fields which are parallel to, perpendicular to, and at an angle to the direction of current flow, whereby logical operations may be performed.

5. A logical circuit for producing sums of 0, 1 and 2 comprising a magnetoresistive logic unit including a thin film ferromagnetic element possessing magnetoresistive properties, current input means connected across said ferromagnetic element, a circuit having a current source coupled with said current input means to establish a current flow through said ferromagnetic element, an output circuit including voltage tap means connected to said ferromagnetic element at points spaced along the direction of current flow, said magnetoresistive logic unit further including a pair of field producing means carried by said ferromagnetic element, said pair of field producing means being oriented diagonal to the direction of current flow and symmetrical with respect to a reference line extending perpendicular to the direction of current flow, and means for selectively energizing said field producing means in various senses to produce resultant magnetic fields which are parallel to, perpendicular to, and at an angle to the direction of current flow, thereby producing three distinct levels of output voltages in said output circuit.

6. A logical circuit for producing sums of 0, 1 and 2 comprising a magnetoresistive logic unit including a substantially square thin film ferromagnetic element possessing magnetoresistive properties, current input leads connected to two opposite sides of said ferromagnetic element, a circuit having a current source coupled with said current input leads to establish a current flow through said ferromagnetic element, an output circuit including voltage tap leads connected to the remaining sides of said ferromagnetic element, said magnetoresistive logic unit further including a pair of field producing means carried by said ferromagnetic element, said field producing means each being oriented 45° to the direction of current flow but oppositely inclined thereto, and means for selectively energizing said field producing means in various senses to produce resultant magnetic fields which are parallel to perpendicular to, and at a nominally 45° angle to the direction of current flow, thereby producing three distinct levels of output voltages in said output circuit.

7. A logical circuit for detecting coincidence between two electrical pulses, said logical circuit comprising a first and a second magnetoresistive logic unit each including a ferromagnetic element possessing magnetoresistive properties, each of said ferromagnetic elements having current input means which are connected in series in a circuit including a current source to establish a current flow through said elements, voltage tap means connected across each of said ferromagnetic elements, a first and a second means associated with each of said ferromagnetic elements for producing magnetic fields diagonal to the direction of current flow, the first and second field producing means associated with one element being symmetrical with respect to a reference line extending perpendicular to the direction of current flow, said first field producing means each being connected to input terminals to receive the electrical pulses whose coincidence is to be detected, each of said second field producing means of one element being connected in an output circuit including a source of potential and the voltage tap means of the other element, whereby there is a single output when the pulses are non-coincident and two outputs when the pulses are coincident.

8. A logical circuit for detecting coincidence between two electrical pulses, said logical circuit comprising a first and a second magnetoresistive logic unit each including a thin film ferromagnetic element possessing magnetoresistive properties, each of said ferromagnetic elements having current input leads which are connected in series in a circuit including a current source to establish a current flow through said elements, voltage tap leads connected across each of said ferromagnetic elements at points spaced along the direction of current flow, a first and a second means carried by each of said ferromagnetic elements for producing magnetic fields diagonal to the direction of current flow, the first and second field producing means associated with one element being symmetrical with respect to a reference line extending transverse to the direction of current flow, each of said first field producing means being connected to input terminals to receive the electrical pulses whose coincidence is to be detected, each of said second field producing means of one element being connected in an output circuit including a source of potential and the voltage tap leads of the other element, whereby a first pulse which leads a second pulse switches one of the ferromagnetic elements while preventing the other element from switching, resulting in a single output, whereas when the pulses are coincident both of said elements are switched and there are two outputs.

No references cited.